(12) United States Patent
Andre et al.

(10) Patent No.: US 9,442,674 B1
(45) Date of Patent: Sep. 13, 2016

(54) USING A PLURALITY OF SUB-BUFFERS AND A FREE SEGMENT LIST TO ALLOCATE SEGMENTS TO A PLURALITY OF THREADS TO USE FOR WRITING DATA

(71) Applicant: INTERNATIONAL BUSINESS MACHINES CORPORATION, Armonk, NY (US)

(72) Inventors: Herve G. P. Andre, Orlando, FL (US); Juan J. Ruiz, Daly City, CA (US); Trung N. Nguyen, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/947,734

(22) Filed: Nov. 20, 2015

(51) Int. Cl.
*G06F 9/04* (2006.01)
*G06F 3/06* (2006.01)
*G06F 13/10* (2006.01)

(52) U.S. Cl.
CPC ........... *G06F 3/0656* (2013.01); *G06F 3/0613* (2013.01); *G06F 3/0683* (2013.01); *G06F 13/102* (2013.01)

(58) Field of Classification Search
CPC ........................................................ G06F 9/04
See application file for complete search history.

(56) References Cited

U.S. PATENT DOCUMENTS

| | | | |
|---|---|---|---|
| 6,094,712 A | 7/2000 | Follett et al. | |
| 6,757,273 B1 | 6/2004 | Hsu et al. | |
| 6,845,430 B2 | 1/2005 | Hopeman et al. | |
| 6,862,635 B1 | 3/2005 | Alverson et al. | |
| 7,146,458 B2 | 12/2006 | Smirnov et al. | |
| 7,528,838 B2 * | 5/2009 | Gosalia | G06F 3/14 345/537 |
| 8,904,067 B2 | 12/2014 | Saputra | |
| 8,929,213 B2 | 1/2015 | Chrysos et al. | |
| 9,003,131 B1 | 4/2015 | Lunev | |
| 9,026,735 B1 | 5/2015 | Torok et al. | |
| 9,055,009 B2 | 6/2015 | Chrysos et al. | |
| 9,197,686 B1 | 11/2015 | Kirkby et al. | |

(Continued)

FOREIGN PATENT DOCUMENTS

EP 2593861 A1 5/2013

OTHER PUBLICATIONS

Office Action dated Mar. 31, 2016, pp. 13, for U.S. Appl. No. 14/947,468, filed Nov. 20, 2015.
Office Action dated Apr. 4, 2016, pp. 14, for U.S. Appl. No. 14/947,521, filed Nov. 20, 2015.
List of Patents or Patent Applications Treated as Related, dated Nov. 20, 2015, pp. 2.

(Continued)

*Primary Examiner* — Cheng-Yuan Tseng
(74) *Attorney, Agent, or Firm* — David W. Victor; Konrad Raynes Davda & Victor LLP

(57) ABSTRACT

Provided are a computer program product, system, and method for using a plurality of sub-buffers and a free segment list to allocate segments to a plurality of threads to use for writing data. Groups of threads are assigned to sub-buffers. At least one segment of data is indicated in each of the sub-buffers. The threads assigned to one of the sub-buffers write to the at least one segment indicated in the sub-buffer to which the threads are assigned. A free segment list indicates segments which are not indicated in one of the sub-buffers. In response to one of the segments in a containing sub-buffer comprising one of the sub-buffers becoming a full segment having less than a threshold amount of free space, the indication of the full segment in the containing sub-buffer is replaced with one of the segments indicated in the free segment list.

22 Claims, 6 Drawing Sheets

(56) References Cited

U.S. PATENT DOCUMENTS

| | | | |
|---|---|---|---|
| 9,286,328 B2* | 3/2016 | Kozin | G06F 11/14 |
| 2004/0004970 A1 | 1/2004 | Lakshmanamurthy et al. | |
| 2006/0225078 A1 | 10/2006 | Anderson | |
| 2007/0140122 A1 | 6/2007 | Murthy | |
| 2010/0153634 A1 | 6/2010 | Fellinger et al. | |
| 2010/0323742 A1 | 12/2010 | Allen et al. | |
| 2010/0332755 A1 | 12/2010 | Bu et al. | |
| 2012/0017214 A1 | 1/2012 | Shannon et al. | |
| 2013/0051478 A1 | 2/2013 | Wu et al. | |
| 2013/0077491 A1 | 3/2013 | Cherian et al. | |
| 2013/0246775 A1 | 9/2013 | Bradbury et al. | |
| 2014/0181794 A1 | 6/2014 | Grawrock et al. | |
| 2014/0282454 A1 | 9/2014 | Bai et al. | |
| 2015/0039840 A1 | 2/2015 | Chandra et al. | |
| 2015/0370717 A1 | 12/2015 | Godard et al. | |

OTHER PUBLICATIONS

U.S. Appl. No. 14/947,686, filed Nov. 20, 2015.

U.S. Appl. No. 14/947,468, filed Nov. 20, 2015.

U.S. Appl. No. 14/947,521, filed Nov. 20, 2015.

Office Action dated May 6, 2016, pp. 26, for U.S. Appl. No. 14/947,686, filed Nov. 20, 2015.

Response dated Jun. 30, 2016, pp. 12, to Office Action dated Mar. 31, 2016, pp. 13, for U.S. Appl. No. 14/947,468, filed Nov. 20, 2015.

Response dated Jun. 6, 2016, pp. 17, to Office Action dated Apr. 4, 2016, pp. 14, for U.S. Appl. No. 14/947,521, filed Nov. 20, 2015.

Response dated Jul. 12, 2016, pp. 12, to Office Action dated May 6, 2016, pp. 26, for U.S. Appl. No. 14/947,686, filed Nov. 20, 2015.

Notice of Allowance dated Jul. 15, 2016, pp. 15, for U.S. Appl. No. 14/947,468, filed Nov. 20, 2015.

\* cited by examiner

Sub-Buffer Assignment

Trace Data Instance

Sub-Buffer Information

Segment Information

USING A PLURALITY OF SUB-BUFFERS AND A FREE SEGMENT LIST TO ALLOCATE SEGMENTS TO A PLURALITY OF THREADS TO USE FOR WRITING DATA

BACKGROUND OF THE INVENTION

1. Field of the Invention

The present invention relates to a computer program product, system, and method for using a plurality of sub-buffers and a free segment list to allocate segments to a plurality of threads to use for writing data.

2. Description of the Related Art

Multiple threads executing a program may generate trace data having information on program execution which is written to a shared circular buffer. Trace data may be collected when an error is detected or may be collected as a result of trace code added to programs to collect certain information on program execution, such as the contents of memory and variables, resulting from program execution. Trace data may be used for debugging errors in the program code.

When writing the trace data to the shared circular buffer, the threads need to acquire a lock to access the shared circular buffer to serialize access. To minimize lock contention, task operations may be optimized to just perform critical operations such as claiming the amount of space currently needed and not using that space until after the lock has been relinquished. In this way, lock contention is reduced by reducing the number of tasks subject to lock contention.

Another technique to minimize lock contention involves splitting the buffer into as many circular sub-buffers as there are threads. In this case, no lock is required as each thread has its own sub-buffer.

A further solution is to put the threads into small groups and divide the total buffer into as many sub-buffers as there are groups. One lock is provided per sub-buffer but the number of group members being small enough, efficient use of locking will lessen the collision and thus the wait suffered.

SUMMARY

Provided are a computer program product, system, and method for using a plurality of sub-buffers and a free segment list to allocate segments to a plurality of threads to use for writing data. Groups of threads are assigned to sub-buffers. At least one segment of data is indicated in each of the sub-buffers. The threads assigned to one of the sub-buffers write to the at least one segment indicated in the sub-buffer to which the threads are assigned. A free segment list indicates segments which are not indicated in one of the sub-buffers. In response to one of the segments in a containing sub-buffer comprising one of the sub-buffers becoming a full segment having less than a threshold amount of free space, the indication of the full segment in the containing sub-buffer is replaced with one of the segments indicated in the free segment list.

DETAILED DESCRIPTION

The above described techniques reduce lock contention by creating sub-buffers of buffer resources for each of the threads or a group of threads. However, by assigning sub-buffer resources to fixed groups of threads, skews in the consumption of buffer resources amongst the threads can lead to inefficient utilization of the sub-buffers, some sub-buffers may wrap quite often while others remain empty or unused. Buffer space allocated to low utilization sub-buffers is not available for use by threads assigned to other high utilization sub-buffers. The low utilization sub-buffers maintain older data that does not get overwritten by their assigned threads, whereas high utilization sub-buffers may have their data frequently overwritten. This results in a buffer time-span differential where high utilization sub-buffers have their more current data overwritten while older data remains in the low utilization sub-buffers which do not have their data overwritten as frequently as the high-utilization buffers.

Described embodiments provide techniques to address these problems by indicating groups of threads assigned to sub-buffers. At least one segment of data is indicated in each of the sub-buffers. Threads assigned to one of the sub-buffers write to the at least one segment indicated in the sub-buffer to which the threads are assigned. Segments not indicated in one of the sub-buffers are indicated in a free segment list. In response to one of the segments becoming full (i.e., having less than a threshold amount of free space), the full segment in the sub-buffer is replaced with one of the segments indicated in the free segment list.

With these embodiments, buffers experiencing high utilization move their full segments to the free segment list where the data remains available on the free segment list until reassigned to a buffer filling a segment and overwritten in the buffer to which it is reassigned. The underutilized buffers may retain their limited number of segments, but the time-span differential is reduced because high utilization sub-buffers move their segments to the free segment list where the data in the segments is are made available for an extended period of time because the segment must wait to move to the end of the free segment list before being recycled and dispatched to another sub-buffer where it may be overwritten.

Figure 1:
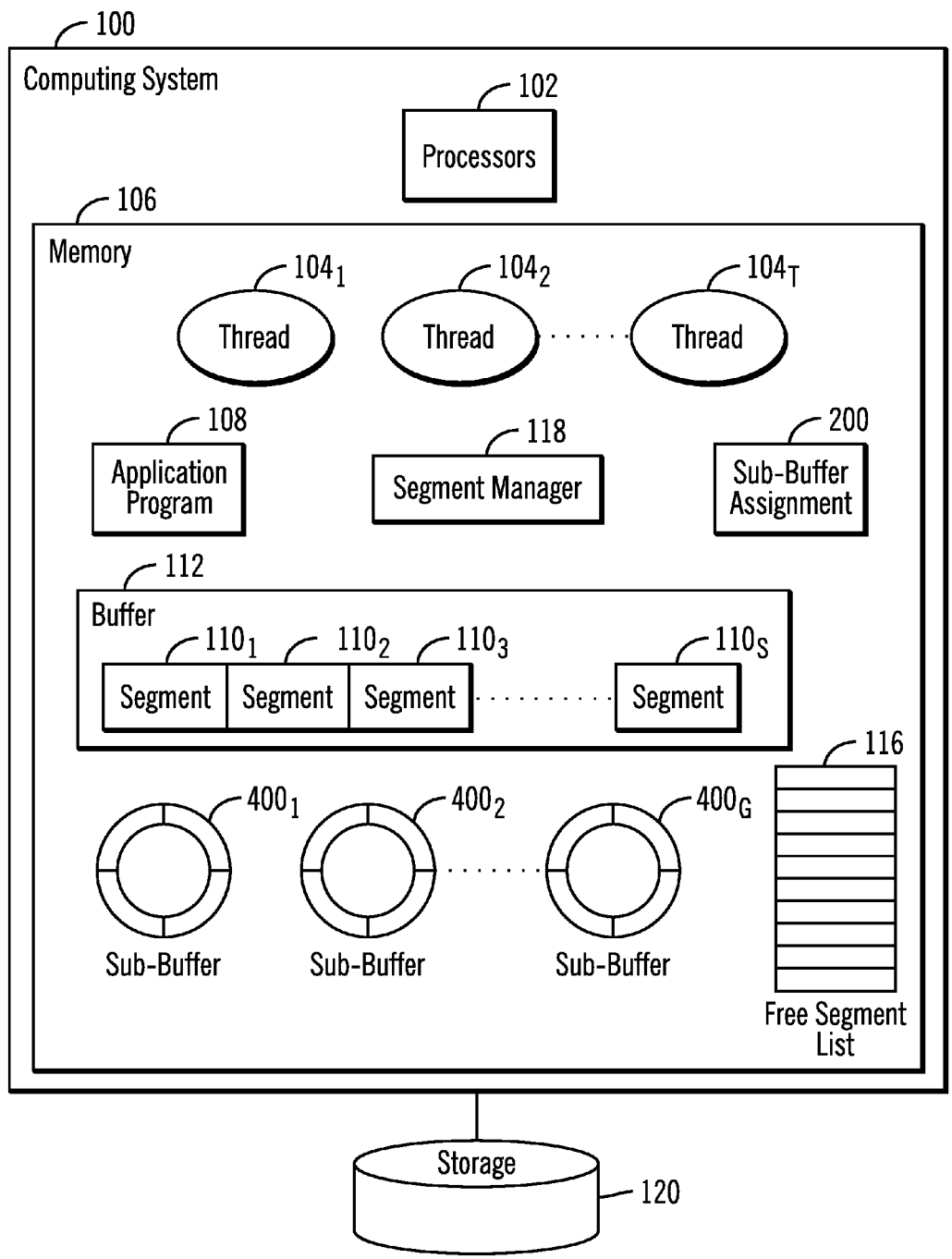
FIG. 1 illustrates an embodiment of a computing environment.

FIG. 1 illustrates an embodiment of a computing environment. A computing system 100 includes one or more processors 102, which may comprise one or more central processing units (CPUs) or a group of multiple cores on a single CPU. The processors 102 may initiate multiple threads $104_1 \ldots 104_T$ in a memory 106, executed by the processors 102, that concurrently execute an application program 108. A thread comprises an independent unit of execution, where different threads may independently submit requests to a same segment of data. Threads may be spawned by processes, where a process may manage and control the operation of multiple threads. The threads $104_1 \ldots 104_T$ may independently execute portions of the application program 108, and may execute portions of the application program 108 in parallel.

The threads $104_1 \ldots 104_T$ write trace dump data to segments $110_1 \ldots 110_s$ of data in a buffer 112 in the memory 106. Trace data may comprise data in memory, errors, log information resulting from the threads $104_1 \ldots 104_T$ executing the application program 108, etc. In alternative embodiments, the threads $104_1 \ldots 104_T$ may write other types of data to the segments $110_1 \ldots 110_s$ other than trace data.

The memory 106 further includes a sub-buffer assignment 200 that provides assignments of sub-buffers $400_1 \ldots 400_G$ to groups of one or more threads $104_1 \ldots 104_T$. The sub-buffers $400_1 \ldots 400_G$ each indicate a plurality of the segments $110_1 \ldots 110_s$. In this way the threads $104_1 \ldots 104_T$ in one of the groups share access to one of the sub-buffers $400_1 \ldots 400_G$. A free segment list 116 indicates those of the segments $110_1 \ldots 110_s$ that are not indicated in one of the sub-buffers $400_1 \ldots 400_G$. For instance, there may be a total of S segments and N segments are assigned to each of the G sub-buffers $400_1 \ldots 400_G$, where N is at least two. If there is an equal number of segments $110_1 \ldots 110_s$ allocated to the sub-buffers $400_1 \ldots 400_G$ and in the free segment list 116, then the total number of segment (S) may, in certain embodiments, be equal to 2*G*N.

In one embodiment, the free segment list 116 may comprise a First-in-First-Out (FIFO) list where a segment having the most current trace data is added to the head of the FIFO list 116 and segments having the oldest trace data are removed from the tail of the FIFO list 116 and moved to a sub-buffers $400_1 \ldots 400_G$. In alternative embodiments, the free segment list 116 may organize data in a different manner than FIFO.

The sub-buffers $400_1 \ldots 400_G$ may comprise circular buffers that provide a circular ordering of N of the segments $110_1 \ldots 110_s$, where each segment is linked to one other segment in the circular buffer. In alternative embodiments, the sub-buffers $400_1 \ldots 400_G$ may comprise linked lists other than circular buffers. In certain described embodiments, the sub-buffers $400_1 \ldots 400_G$ each have an equal N number of segments. In alternative embodiments, the sub-buffers $400_1 \ldots 400_G$ may have different number of allocated segments.

A segment manager 118 manages the free segment list 116 and performs operations to replace a full segment $110_{FU}$ in one of the sub-buffers $400_1 \ldots 400_G$ with a free segment $110_{FR}$ from the free segment list 116 and adds the full segment $110_{FU}$ to the free segment list 116 to be reassigned to another sub-buffer $400_1 \ldots 400_G$ after all other segments in the free segment list 116 are used. A segment may be deemed full when it has no more available space or less than a threshold amount of free space.

The computing system 100 may further be connected to a storage 120 in which data in the memory 106 may be stored.

The segment manager 118 is shown in FIG. 1 as program code loaded into the memory 106 and executed by the processors 102. Alternatively, some or all of the functions may be implemented in hardware devices in the storage controller 104, such as in Application Specific Integrated Circuits (ASICs).

The storage 120 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The memory 106 may comprise one or more a suitable volatile or non-volatile memory devices, including Dual In Line Memory Modules (DIMM) and other suitable memory devices, such as those described above described above.

Figure 2:
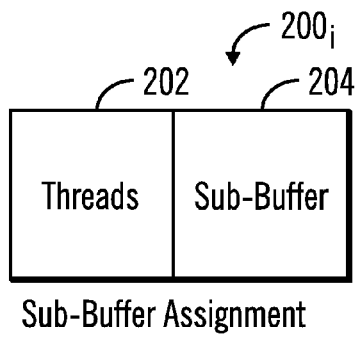
FIG. 2 illustrates an embodiment of a sub-buffer assignment.

FIG. 2 illustrates an embodiment of an entry $200_i$ in the sub-buffer assignment 200 indicating a group of threads 202 and the sub-buffer 204 to which they are assigned to write data, such as trace data, to the segments in the sub-buffer 204. In certain implementations, the threads 202 assigned to one sub-buffer 204 may comprise threads spawned from one process.

Figure 3:
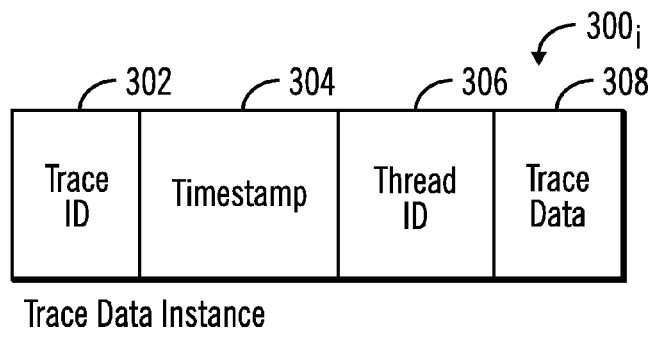
FIG. 3 illustrates an embodiment of an instance of trace data.

FIG. 3 illustrates an embodiment of an instance of trace data $300i$ written to one of the segments $110_1 \ldots 110_s$, including a trace identifier (ID) 302; a timestamp 304 at which the trace data was generated; a thread ID 306 of the thread $104_1, 104_2 \ldots 104_T$ that generated the trace data, and the trace data 308 providing the output from memory, a program, errors, etc.

Figure 4:
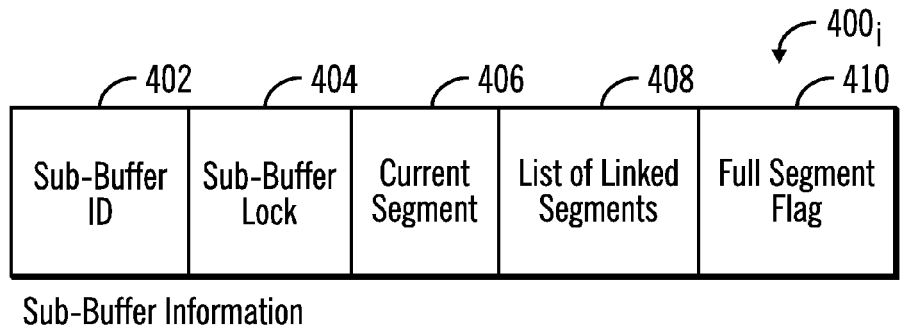
FIG. 4 illustrates an embodiment of sub-buffer information.

FIG. 4 illustrates an embodiment of an instance of a sub-buffer $400_i$ as including a sub-buffer identifier (ID) 402; a sub-buffer lock 404 the threads $104_1 \ldots 104_T$ assigned to the sub-buffer 402 need to write to a segment indicated in the sub-buffer 402; a current segment 406 indicating the segment in the sub-buffer 402 currently being accessed or used for writes; a list of linked segments 408, where the linked segments may form a circular buffer; and a full segment flag 410 indicating one of the segments in the sub-buffer 102 that is full and needs to be replaced with a segment from the free segment list 116.

In the embodiment of FIG. 4, the lock 404 applies to the entire sub-buffer $400_i$ to serialize access to the sub-buffer 402 by the threads $104_1 \ldots 104_T$ assigned to the sub-buffer 402. In an alternative embodiment, there may be a separate lock for each segment in the sub-buffer to allow multiple threads to concurrently access different of the segments $110_1 \ldots 110_s$ allocated to the sub-buffer $400_i$. In the embodiment where there is a separate lock for each segment assigned to a sub-buffer $400_i$, there may be no sub-buffer lock 404. The use of segment level locks ensures that while the segment manager 118 is holding the lock to a full segment $110_{FU}$ that it is replacing, the lock is not blocking other segments in the sub-buffer $400_i$ from being utilized.

In one embodiment, the list of linked segments 408 a list of pointers that reference the actual segments $110_1 \ldots 110_s$ in the buffer 112. Thus, the sub-buffers $400_1 \ldots 400_G$ and free segment list 116 do not include the actual segments $110_1 \ldots 110_s$, but instead pointers to the segments $110_1 \ldots 110_s$ in the buffer 112. In an alternative embodiment, the sub-buffers $400_1 \ldots 400_G$ and free segment list 116 may include the actual segments of data and the buffer 112 may just comprise a list of pointers to the segments $110_1 \ldots 110_s$ maintained in the sub-buffers $400_1 \ldots 400_G$ and the free segment list 116. In such embodiments, the sub-buffers $400_1 \ldots 400_G$ comprise the actual buffers having the segment $110_1 \ldots 110_s$ data.

Figure 5:
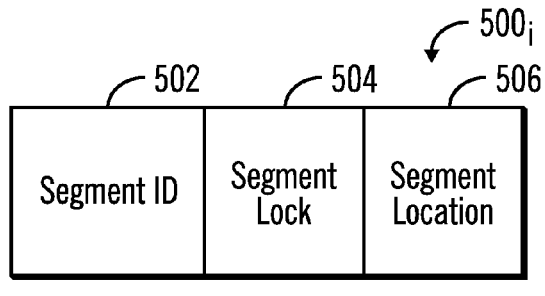
FIG. 5 illustrates an embodiment of segment information.

FIG. 5 illustrates an embodiment of an instance of segment information $500_i$ maintained for each of the segments $110_1 \ldots 110_s$, including a segment identifier (ID) 502 identifying the segment, a segment lock 504 in the embodiment where there is a separate lock for each segment; and a segment location 506 indicating the sub-buffer $400_1 \ldots 400_G$ or free segment list 116 in which the segment 502 is located. The segment information 500i may be maintained with the segments $110_1 \ldots 110_s$ in the buffer 112. In an embodiment where the segment information $500_i$ is not maintained with the segment $110_i$ itself, an extra element indicating the physical location of the segment $110_i$ (a pointer to the segment) may be included with the segment information $500_i$.

Figure 6:
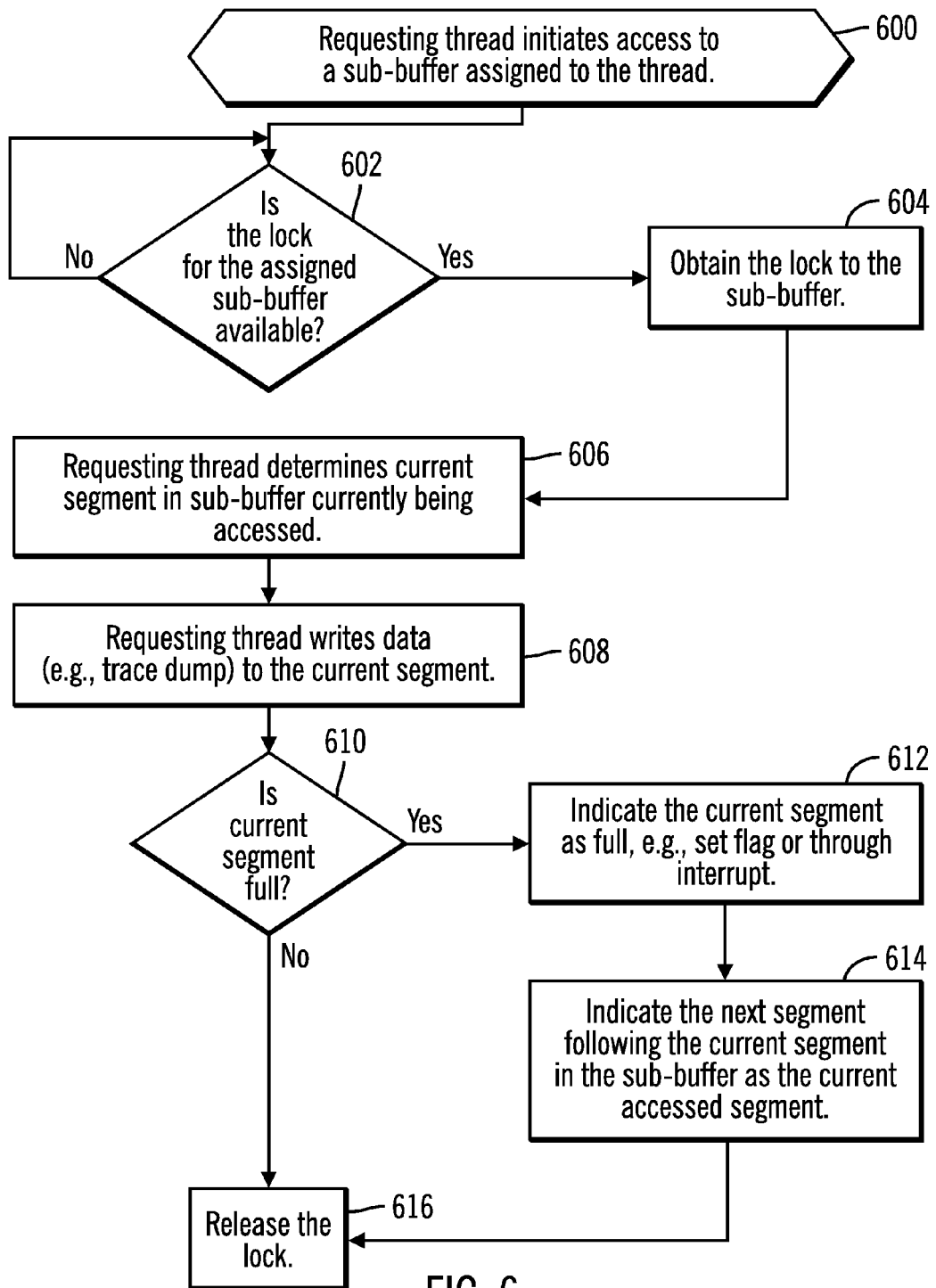
FIGS. 6 and 8 illustrate embodiments of operations to process a request for a lock to write data to a segment in a sub-buffer.

FIG. 6 illustrates an embodiment of operations performed by a requesting thread $104_R$ comprising one of the threads $104_1 \ldots 104_T$ and the segment manager 118 to perform operations with respect to the sub-buffers $400_1 \ldots 400_G$ in an embodiment where there is a sub-buffer lock 404. Upon requesting thread $104_R$ initiating (at block 600) access to the sub-buffer 400i assigned to the requesting thread $104_R$, the requesting thread $104_R$ determines (at block 602) whether the sub-buffer lock 404 for the assigned sub-buffer $400_i$ is available. The requesting thread $104_R$ may request the lock from a lock manager (not shown) or check a lock status to determine if the lock is available. If the lock is not available, then the requesting thread $104_R$ waits for the lock to become available. If (at block 602) the sub-buffer lock 404 is available, then the requesting thread $104_R$ obtains (at block 604) the sub-buffer lock 404. The lock may be obtained from a lock manager or by the requesting thread $104_R$ updating lock status to indicate that it holds the lock.

The requesting thread $104_R$ determines (at block 606) the current segment 406 in the sub-buffer $400_i$ currently being accessed and writes (at block 608) data to the current segment 406, such as trace dump data. If (at block 610) the current segment is full, such as before or after writing the trace data, then the requesting thread $104_R$ or other thread indicates (at block 612) the current segment 406 as full, such as by setting the full segment flag 410 to indicate the full segment or by initiating an interrupt to the segment manager 418 of the full segment status. The next segment following the current segment in the list of linked segments 408 is indicated (at block 614) as the current segment 406. From block 614 or if (at block 610) the current segment 404 is not full, the requesting thread $104_R$ releases (at block 616) the sub-buffer lock 404 to allow other of the threads $104_1 \ldots 104_T$ assigned to the sub-buffer $400_i$ to write to the segments in the sub-buffer $400_i$.

Figure 7:
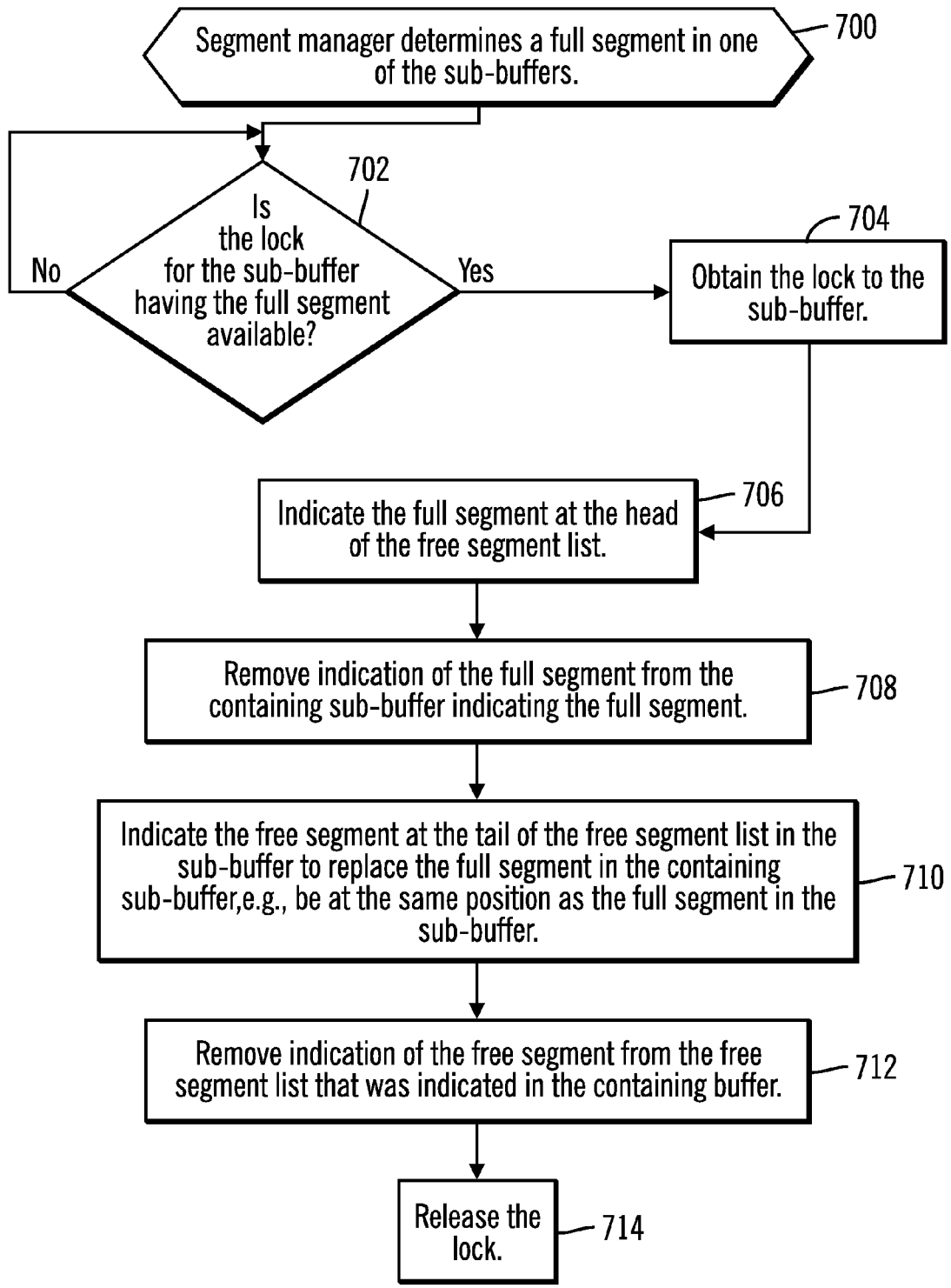
FIG. 7 illustrates an embodiment of operations to replace a full segment in a sub-buffer with a segment from a free segment list.

FIG. 7 illustrates an embodiment of operations performed by the segment manager 118 to swap a full segment $110_{FU}$ in one of the sub-buffers $400_1 \ldots 400_G$ with a segment from the free segment list 116. The segment manager 118 may be notified of a full segment $110_{FU}$ from an interrupt or by processing the sub-buffer information $400_i$ to determine if the full segment flag 410 for one sub-buffer $400_i$ identifies a full segment in the sub-buffer $400_i$. Upon the segment manager 118 determining (at block 700) a full segment $110_{FU}$ in one of the sub-buffers $400_i$, the segment manager 118 determines (at block 702) whether the sub-buffer lock 404 for the sub-buffer $400_i$ having the full segment $110_{FU}$ is available. If so, then the segment manager 118 obtains (at block 704) the lock 404 for the sub-buffer $400_i$. As mentioned locks may be obtained from a lock manager or by updating lock status fields. If (at block 702), the lock 404 is not available, then the segment manager 118 waits for the lock 404 to become available (at block 702).

After obtaining the lock (at block 704), the segment manager 118 performs the operations at blocks 706 through 714 to replace the full segment $110_{FU}$ in the sub-buffer $400_i$ with a free segment $110_{FR}$ indicated in the free segment list 116. At block 706, the segment manager 118 indicates (at block 706) the full segment $110_{FU}$ at the head of the free segment list 116 and removes (at block 708) indication of the full segment $110_{FU}$ from the containing sub-buffer $400_i$ indicating the full segment $110_{FU}$.

The segment manager 118 indicates (at block 710) the free segment $110_{FR}$ at the tail of the free segment list 116 in the containing sub-buffer $400_i$ to replace the full segment $110_{FU}$ in the containing sub-buffer $400_i$ with a free segment $110_{FR}$ from the free segment list 116. In one embodiment, when moving indication of the free segment $110_{FR}$ from the free segment list 116 to the sub-buffer $400_i$, the free segment $110_{FR}$ is added to the list of linked segments 408 by adjusting the pointer of the segment 110 that previously pointed to the full segment $110_{FU}$ to point to the segment $110_{FR}$ from the free segment list 116 and having the free segment $110_{FR}$ point to the segment $110_k$ that followed the removed full segment $110_{FU}$ in the list 408. Indication of the segment $110_{FR}$ added to the containing sub-buffer $400_i$ is removed (at block 712) from the free segment list 116 and the sub-buffer lock 404 is released (at block 714).

With the described embodiments of FIGS. 6 and 7, each group of threads $104_1 \ldots 104_T$ is assigned a sub-buffer $400_1 \ldots 400_G$ to reduce lock contention for the segments $110_1 \ldots 110_s$ by providing a greater number of locks. Further, by limiting the number of segments $110_1 \ldots 110_s$ assigned to sub-buffers $400_1 \ldots 400_G$, such as to two segments, those sub-buffers $400_1 \ldots 400_G$ experiencing low utilization do not hold many unused segments because sub-buffers have a limited number of segments. Those sub-buffers $400_1 \ldots 400_G$ experiencing high activity will always be provided a new segment when needed. Further, with described embodiments, the trace data in the segments remains in the segments when the segments are moved to the free segment list 116 and when moved back to one of the sub-buffers to replace a full segment up until the moment the segment is overwritten in the sub-buffer. Thus, the trace data $300_i$ remains available for access until the last moment when overwritten.

Further, by removing full segments from the tail of a FIFO free list 116, the full segments remain available in the free segment list 116 for a maximum amount of time until they are needed for use in a sub-buffer to replace a full segment in a sub-buffer. Further, the data in the free segment added back to a sub-buffer from the free segment list 116 remains available for a maximum amount of time in the sub-buffer comprising a circular buffer, because the segment $110_{FR}$ replaced from the free list is not overwritten until threads assigned to the sub-buffer $400_i$ complete writing to all other segments in the sub-buffer following the full segment $110_{FU}$ in the sub-buffer $400_i$ replaced by the free segment $110_{FR}$. Thus, the use of the free segment list 116 and circular buffer structures ensures that the newest data in a full segment returned to the free segment list 116 remains available and not overwritten for a maximum time possible.

Figure 8:
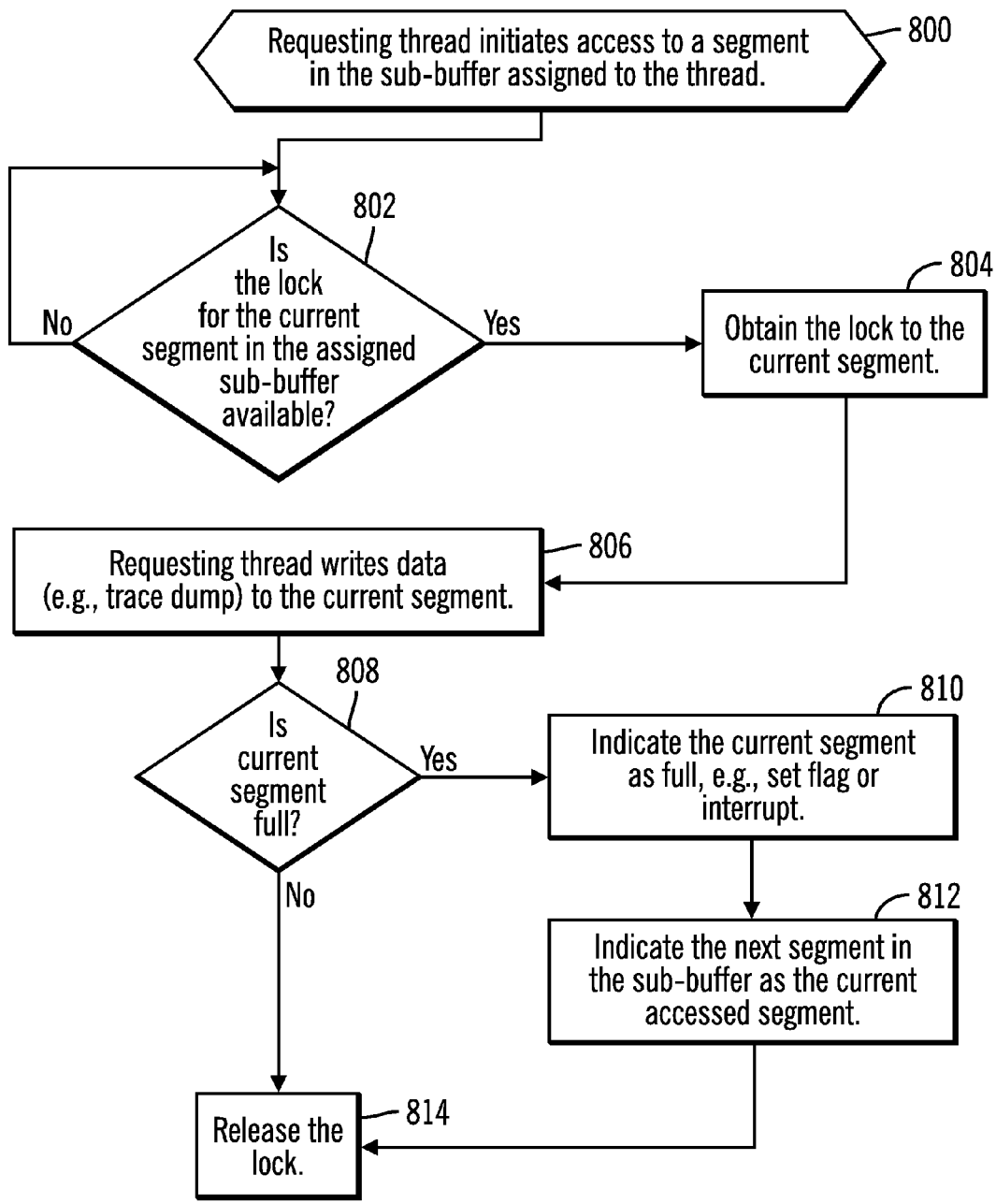

FIG. 8 illustrates an alternative embodiment of the operations of FIG. 6 when there is a lock 504 for each segment in a sub-buffer, such as included with segment information $500_i$. Upon the requesting thread $104_R$ initiating (at block 800) access to the current segment 406 in the sub-buffer 400i assigned to the requesting thread $104_R$, the requesting thread $104_R$ (or a lock manager) determines (at block 802) whether the requested segment lock 504 for the current segment 406 is available. If not, then the control returns to block 802 to wait for the segment lock 504 to become available. If (at block 802) the segment lock 504 is available, then the requesting thread $104_R$ obtains (at block 804) the segment lock 504. The segment lock 504 may be granted by a lock manager or by updating a lock status field.

The requesting thread $104_R$ writes (at block 806) data to the current segment 406, such as trace dump data. If (at block 808) the current segment is full, such as before or after writing the trace data, then the requesting thread $104_R$ or other thread indicates (at block 810) the current segment 406 as full, such as by setting the full segment flag 410 to indicate the full segment $110_{FU}$ or by initiating an interrupt to the segment manager 118 of the full segment status. The next segment following the current segment in the list of linked segments 408 is indicated (at block 812) as the current segment 406. From block 812 or if (at block 808) the current segment 406 is not full, then the requesting thread $104_R$ releases (at block 814) the segment lock 504 to allow other of the threads $104_1 \ldots 104_T$ assigned to the sub-buffer $400_i$ to write to the segments in the sub-buffer $400_i$.

In implementations where there are segment level locks, the operations of FIG. 7 would be changed such that at blocks 702 and 704 the request is made with respect to a segment lock 504 on the full segment $110_{FU}$ in the sub-buffer $400_i$ to replace instead of a sub-buffer lock 404, which locks all segments in the sub-buffer. When segment locks are provided, there is less contention because when the segment manager 118 is replacing a full segment $110_{FU}$ with a free segment $110_{FR}$ and obtains a lock on the full segment $110_{FU}$ being replaced, other threads $104_1 \ldots 104_T$ assigned to the sub-buffer $400_i$ may concurrently access other segments following the full segment $110_{FU}$ while the full segment $110_{FU}$ is being replaced. This concurrent access through the use of segment locks reduces contention and allows a full segment to be replaced while threads may continue to write to other segments in the sub-buffer.

The use of segment level locks in FIG. 7 also experiences all of the other benefits described with respect to FIGS. 7 and 8 of reducing lock contention, preventing low utilization sub—from holding an extensive number of segments, and maximizing the amount of time data remains available on the segments through the use of the circular buffer structure of the sub-buffers $400_1 \ldots 400_G$ and the free segment list 116. This reduces the buffer time-span differential among groups by extending the time the newer data remains available in segments.

In the described embodiment, the variable "i", "j", "k", when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
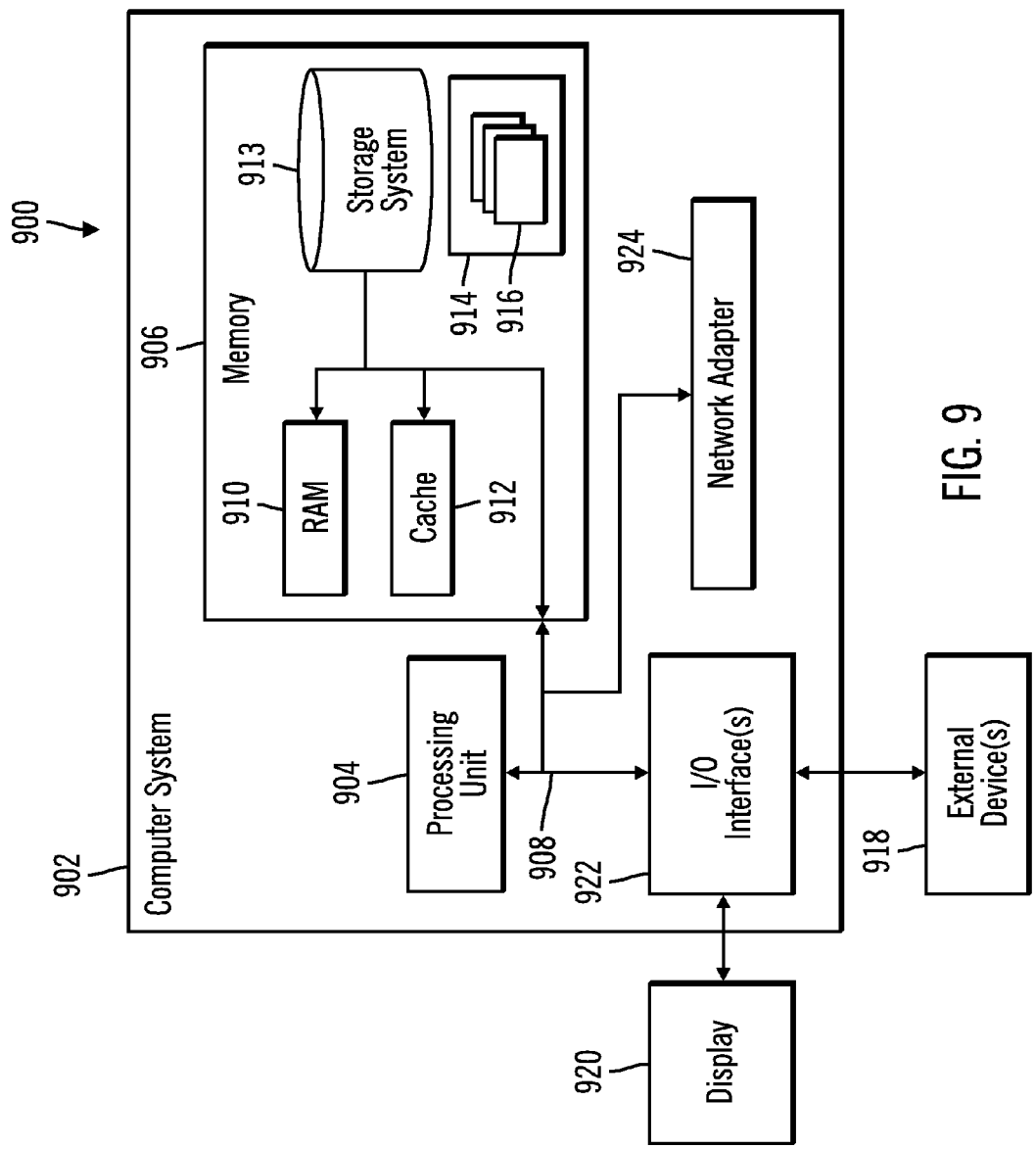
FIG. 9 illustrates a computing environment in which the components of FIG. 1 may be implemented.

The computational components of FIG. 1, including the computing system 100 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data written by multiple threads executed by at least one processing unit, the computer program product comprising a computer readable storage medium having computer readable program code embodied therein that when executed performs operations, the operations comprising:
   indicating groups of threads assigned to sub-buffers;
   indicating at least one segment of data in each of the sub-buffers, wherein the threads assigned to one of the sub-buffers write to the at least one segment of data indicated in the sub-buffer to which the threads are assigned;
   indicating segments in a free segment list which are not indicated in one of the sub-buffers; and
   in response to one of the segments in a containing sub-buffer comprising one of the sub-buffers becoming a full segment having less than a threshold amount of free space, replacing the indication of the full segment in the containing sub-buffer with one of the segments indicated in the free segment list.

2. The computer program product of claim 1, wherein the replacing the indication of the full segment with one of the segments in the free segment list comprises:
   indicating the full segment in the free segment list;
   removing indication of the full segment from the containing sub-buffer;
   indicating one of the segments in the free segment list in the containing sub-buffer to replace the full segment in the containing sub-buffer; and
   removing indication of the segment from the free segment list that was indicated in the containing sub-buffer.

3. The computer program product of claim 1, wherein the segments indicated in the sub-buffers and the free segment list comprise segments of data stored in a main buffer, wherein the operations further comprise:
   processing the segments in the main buffer to provide information on data written to the segments.

4. The computer program product of claim 3, wherein the threads write trace data to the segments stored in the main buffer and indicated in the sub-buffers to which they are assigned, wherein each written instance of the trace data includes a timestamp, a thread identifier of the thread writing the trace data, and the trace data, wherein the operations further comprise
   sorting the trace data in the segments in the main buffer by the timestamp to enable a user to search by the thread identifier of the sorted trace data.

5. The computer program product of claim 1, wherein the data written to the segments while the segments are indicated in one of the sub-buffers remains in the segments after the segment is indicted in the segment free segment list and after indication of the segment is moved from the free segment list to one of the sub-buffers until being overwritten after being moved from the free segment list to one of the sub-buffers.

6. The computer program product of claim 1, wherein there is a lock for each of the sub-buffers to serialize threads write access to the sub-buffers to which they are assigned, wherein the operations further comprise:
   providing the lock for the containing sub-buffer in order to perform the replacing the indication of the full segment in the containing sub-buffer with one of the segments in the free segment list.

7. The computer program product of claim 1, wherein the operations further comprise:
   indicating, by the thread that caused the full segment to become full when writing to the full segment, that the segment is full; and
   in response to processing, by a management thread, the indication that the full segment is full, performing, by the management thread the operation of replacing the indication of the full segment in the containing sub-buffer with one of the segments in the free segment list.

8. The computer program product of claim 1, wherein the sub-buffers comprise circular buffers, wherein the segments indicated in each of the sub-buffers are linked to from the circular buffer, wherein the segment in the free segment list replacing the full segment in the containing sub-buffer is indicated at a position in the circular buffer where the full segment was located, wherein threads assigned to the sub-buffer continue to write to the segments following the full segment removed from the circular buffer and write to the segment from the free segment list that replaced the full segment when reaching a position of the free segment in the circular buffer, and wherein the free segment list comprises a First-in-First-Out (FIFO) list so that the segment in the free segment list having oldest of the data in the free segment list is used first from the free segment list to replace the full segment.

9. The computer program product of claim 1, wherein there is a segment lock of a plurality of segment locks for each of the segments in each of the sub-buffers to serialize threads access to the segments in the sub-buffers, wherein the operations further comprise:
holding, by a plurality of the threads, the segment locks for the segments in the one of the sub-buffers to allow concurrent access to the segments in the sub-buffer by different threads assigned to the sub-buffer.

10. The computer program product of claim 9, wherein one thread holds the segment lock to the full segment when replacing the full segment with the segment from the free segment list, wherein the operations further comprise:
accessing, by one of the threads, the segment lock to a following segment in the containing sub-buffer following the full segment while the segment lock to the full segment is held while replacing the full segment with the segment from the free segment list; and
writing, by the thread accessing the segment lock for the following segment, data to the following segment while the full segment is being replaced by the segment from the free segment list.

11. A system, comprising:
at least one processor;
a computer readable storage medium having computer readable program code embodied therein that when executed by the at least one processor performs operations, the operations comprising:
indicating groups of threads assigned to sub-buffers;
indicating at least one segment of data in each of the sub-buffers, wherein the threads assigned to one of the sub-buffers write to the at least one segment of data indicated in the sub-buffer to which the threads are assigned;
indicating segments in a free segment list which are not indicated in one of the sub-buffers; and
in response to one of the segments in a containing sub-buffer comprising one of the sub-buffers becoming a full segment having less than a threshold amount of free space, replacing the indication of the full segment in the containing sub-buffer with one of the segments indicated in the free segment list.

12. The system of claim 11, wherein the replacing the indication of the full segment with one of the segments in the free segment list comprises:
indicating the full segment in the free segment list;
removing indication of the full segment from the containing sub-buffer;
indicating one of the segments in the free segment list in the containing sub-buffer to replace the full segment in the containing sub-buffer; and
removing indication of the segment from the free segment list that was indicated in the containing sub-buffer.

13. The system of claim 11, wherein the segments indicated in the sub-buffers and the free segment list comprise segments of data stored in a main buffer, wherein the operations further comprise:
processing the segments in the main buffer to provide information on data written to the segments.

14. The system of claim 13, wherein the threads write trace data to the segments stored in the main buffer and indicated in the sub-buffers to which they are assigned, wherein each written instance of the trace data includes a timestamp, a thread identifier of the thread writing the trace data, and the trace data, wherein the operations further comprise
sorting the trace data in the segments in the main buffer by the timestamp to enable a user to search by the thread identifier of the sorted trace data.

15. The system of claim 11, wherein the data written to the segments while the segments are indicated in one of the sub-buffers remains in the segments after the segment is indicted in the segment free segment list and after indication of the segment is moved from the segment free list to one of the sub-buffers until being overwritten after being moved from the free segment list to one of the sub-buffers.

16. The system of claim 11, wherein there is a lock for each of the sub-buffers to serialize threads write access to the sub-buffers to which they are assigned, wherein the operations further comprise:
providing the lock for the containing sub-buffer in order to perform the replacing the indication of the full segment in the containing sub-buffer with one of the segments in the free segment list.

17. A method for managing data written by multiple threads executed by at least one processing unit, comprising:
indicating groups of threads assigned to sub-buffers;
indicating at least one segment of data in each of the sub-buffers, wherein the threads assigned to one of the sub-buffers write to the at least one segment of data indicated in the sub-buffer to which the threads are assigned;
indicating segments in a free segment list which are not indicated in one of the sub-buffers; and
in response to one of the segments in a containing sub-buffer comprising one of the sub-buffers becoming a full segment having less than a threshold amount of free space, replacing the indication of the full segment in the containing sub-buffer with one of the segments indicated in the free segment list.

18. The method of claim 17, wherein the replacing the indication of the full segment with one of the segments in the free segment list comprises:
indicating the full segment in the free segment list;
removing indication of the full segment from the containing sub-buffer;
indicating one of the segments in the free segment list in the containing sub-buffer to replace the full segment in the containing sub-buffer; and
removing indication of the segment from the free segment list that was indicated in the containing sub-buffer.

19. The method of claim 17, wherein the segments indicated in the sub-buffers and the free segment list comprise segments of data stored in a main buffer, further comprising:
processing the segments in the main buffer to provide information on data written to the segments.

20. The method of claim 19, wherein the threads write trace data to the segments stored in the main buffer and indicated in the sub-buffers to which they are assigned, wherein each written instance of the trace data includes a timestamp, a thread identifier of the thread writing the trace data, and the trace data, further comprising:

sorting the trace data in the segments in the main buffer by the timestamp to enable a user to search by the thread identifier of the sorted trace data.

21. The method of claim 17, wherein the data written to the segments while the segments are indicated in one of the sub-buffers remains in the segments after the segment is indicted in the segment free segment list and after indication of the segment is moved from the segment free list to one of the sub-buffers until being overwritten after being moved from the free segment list to one of the sub-buffers.

22. The method of claim 17, wherein there is a lock for each of the sub-buffers to serialize threads write access to the sub-buffers to which they are assigned, further comprising:
providing the lock for the containing sub-buffer in order to perform the replacing the indication of the full segment in the containing sub-buffer with one of the segments in the free segment list.

* * * * *